(12) United States Patent
Baptist et al.

(10) Patent No.: US 9,152,489 B2
(45) Date of Patent: Oct. 6, 2015

(54) REVISION SYNCHRONIZATION OF A DISPERSED STORAGE NETWORK

(75) Inventors: Andrew Baptist, Chicago, IL (US);
Wesley Leggette, Oak Park, IL (US);
Ilya Volvovski, Chicago, IL (US); Jason K. Resch, Chicago, IL (US); Greg Dhuse, Chicago, IL (US); Bart Cilfone, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 764 days.

(21) Appl. No.: 12/903,209

(22) Filed: Oct. 13, 2010

(65) Prior Publication Data

US 2011/0161754 A1 Jun. 30, 2011

Related U.S. Application Data

(60) Provisional application No. 61/290,775, filed on Dec. 29, 2009.

(51) Int. Cl.
| | |
|---|---|
| *G06F 12/00* | (2006.01) |
| *G06F 11/07* | (2006.01) |
| *G06F 21/10* | (2013.01) |
| *G06F 12/08* | (2006.01) |
| *G06F 11/10* | (2006.01) |
| *G06F 9/46* | (2006.01) |

(52) U.S. Cl.
CPC ............ *G06F 11/0745* (2013.01); *G06F 9/467* (2013.01); *G06F 11/1064* (2013.01); *G06F 11/1092* (2013.01); *G06F 12/0813* (2013.01); *G06F 12/0815* (2013.01); *G06F 21/10* (2013.01); *G06F 2211/1028* (2013.01); *G06F 2211/1057* (2013.01)

(58) Field of Classification Search
USPC .................................................. 711/147, 141
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Aimee Li
*Assistant Examiner* — Prasith Thammavong
(74) *Attorney, Agent, or Firm* — Garlick & Markison; Timothy W. Markison

(57) ABSTRACT

A method begins by a processing module receiving a write request message from a dispersed storage (DS) processing module, wherein the write request message includes a slice name, a DS processing module most-recent slice revision, a new slice revision, and an encoded directory slice of directory information regarding storage of data. The method continues with the processing module obtaining, from local memory, a DS unit most-recent slice revision based on the slice name. The method continues with the processing module storing the new slice revision as the DS unit most-recent slice revision and storing the encoded directory slice when the DS unit most-recent slice revision compares favorably to the DS processing module most-recent slice revision.

10 Claims, 14 Drawing Sheets

(56) References Cited

U.S. PATENT DOCUMENTS

| | | | |
|---|---|---|---|
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,440,966 B2* | 10/2008 | Adkins et al. | 1/1 |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0162808 A1* | 8/2004 | Margolus et al. | 707/1 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1* | 4/2007 | Gladwin et al. | 711/154 |
| 2007/0079082 A1* | 4/2007 | Gladwin et al. | 711/154 |
| 2007/0079083 A1 | 4/2007 | Gladwin et al. | |
| 2007/0088970 A1 | 4/2007 | Buxton et al. | |
| 2007/0174192 A1* | 7/2007 | Gladwin et al. | 705/40 |
| 2007/0198685 A1* | 8/2007 | Phatak | 709/223 |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0072321 A1* | 3/2011 | Dhuse | 714/55 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

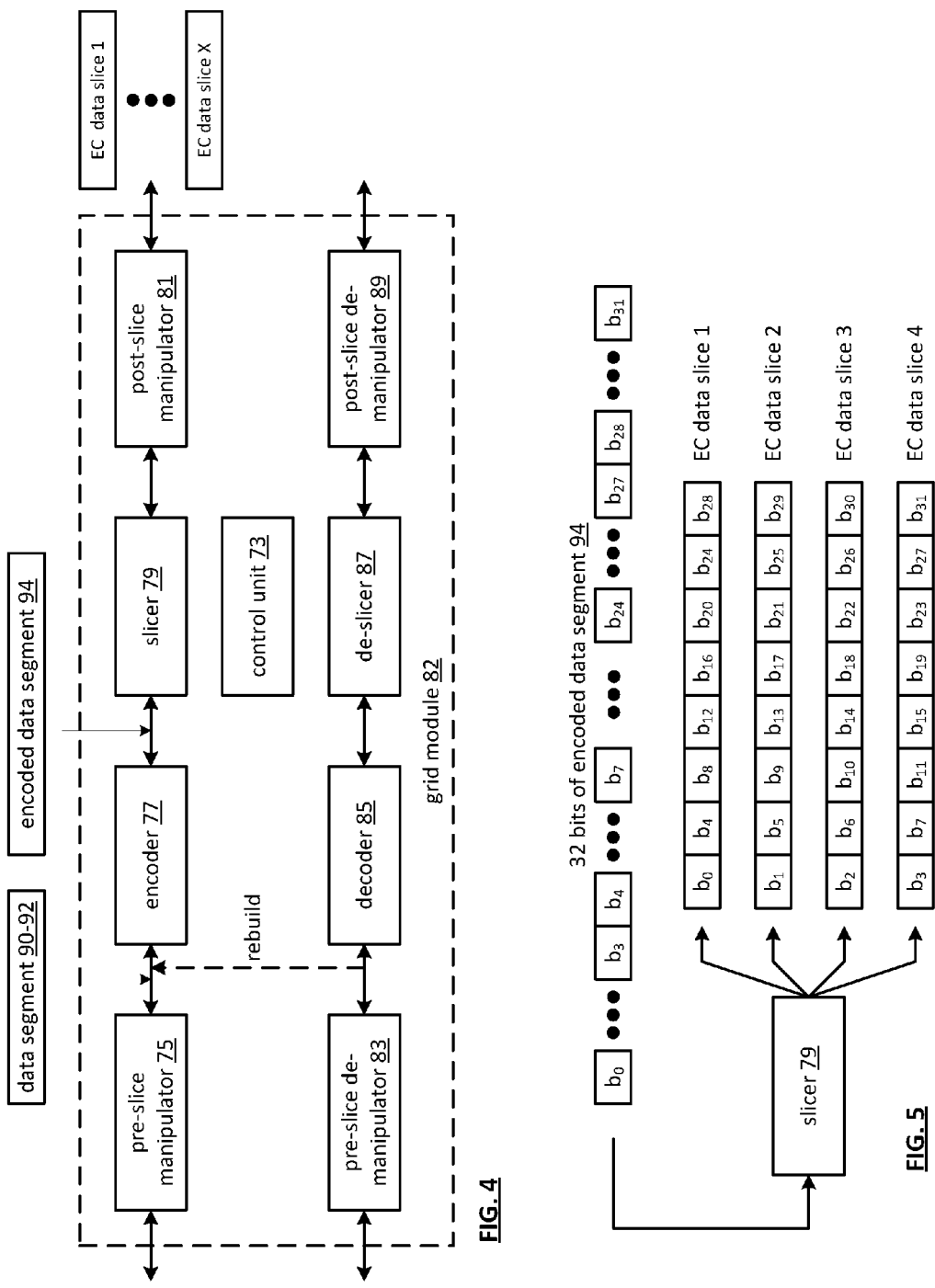

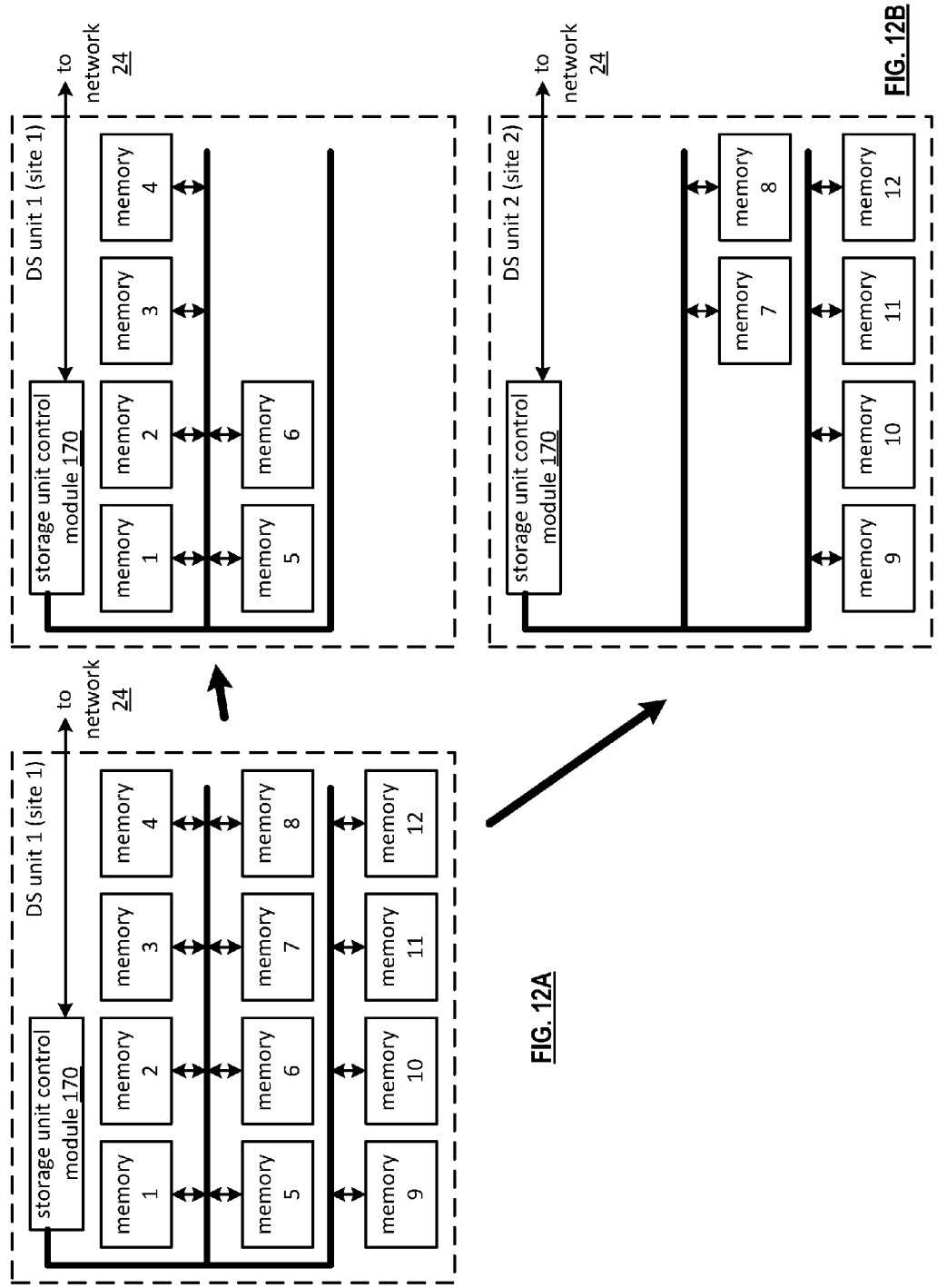

REVISION SYNCHRONIZATION OF A DISPERSED STORAGE NETWORK

CROSS REFERENCE TO RELATED PATENTS

The present U.S. Utility Patent Application claims priority pursuant to 35 U.S.C. §119(e) to U.S. Provisional Application Ser. No. 61/290,775, entitled "DISTRIBUTED STORAGE DATA SYNCHRONIZATION," filed Dec. 29, 2009, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 12A is a schematic block diagram of an embodiment of a dispersed storage network (DSN) memory in accordance with the invention;

FIG. 12B is another schematic block diagram of another embodiment of a dispersed storage network (DSN) memory in accordance with the invention;

DETAILED DESCRIPTION OF THE INVENTION

Figure 1:
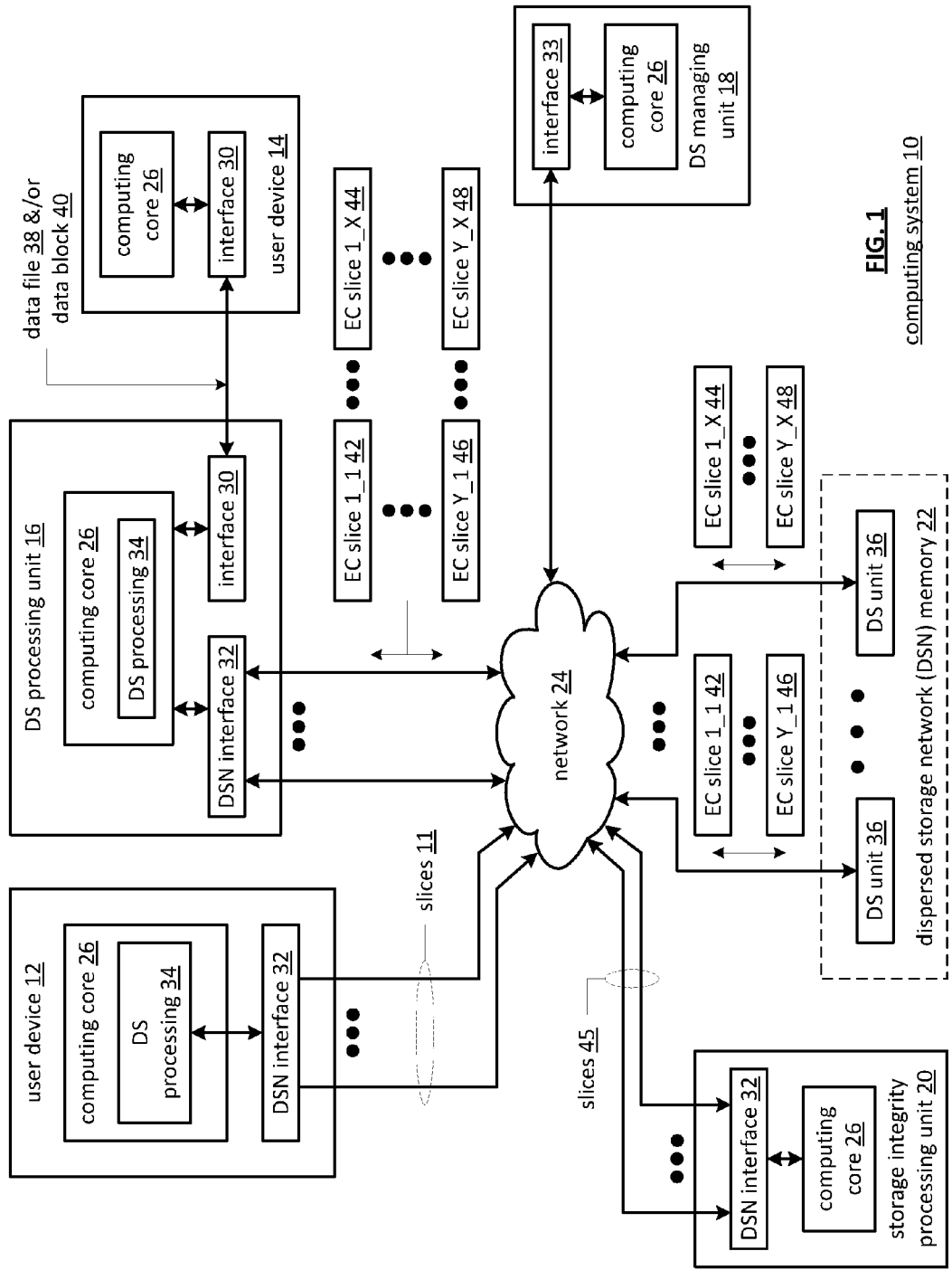
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-17.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
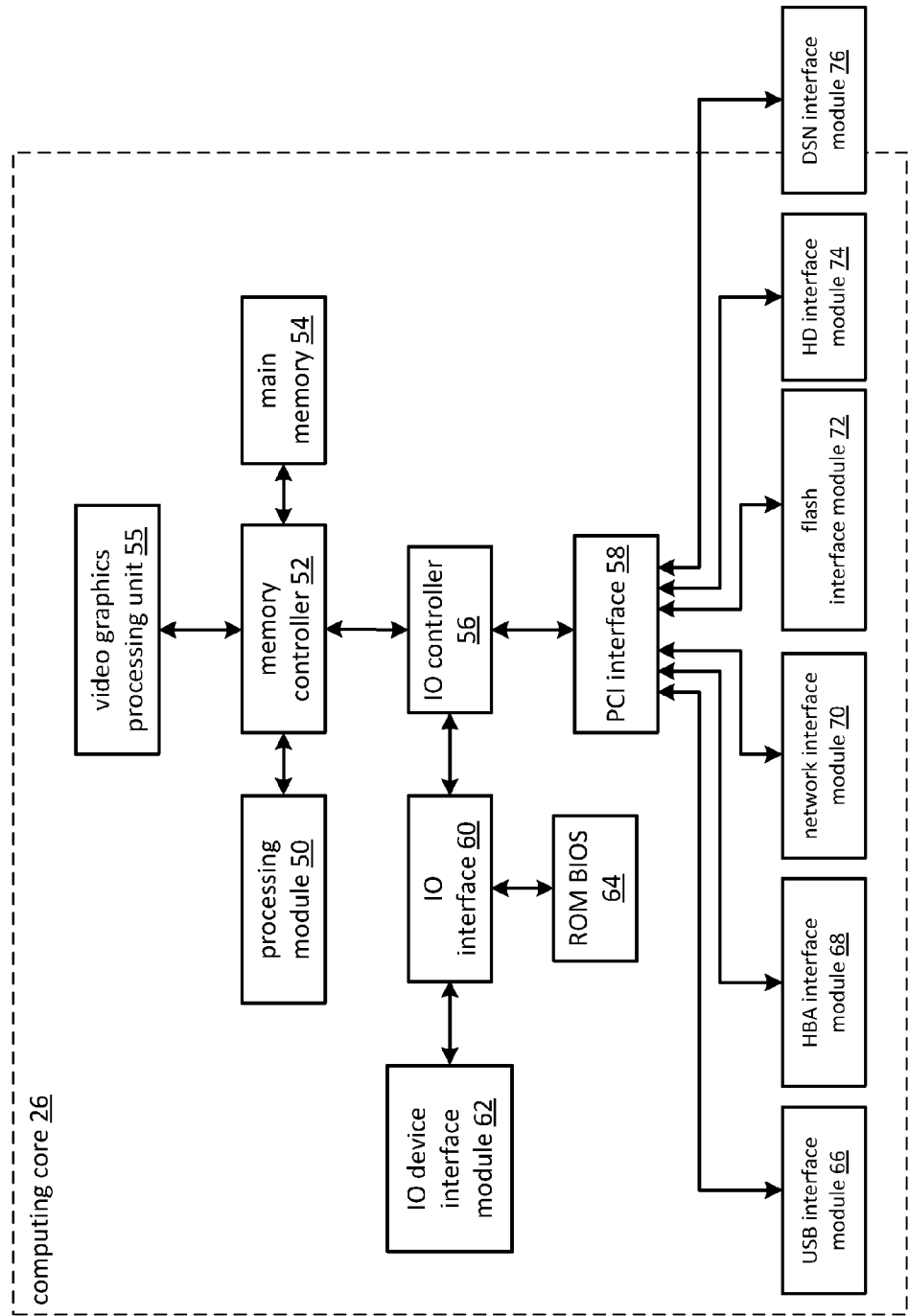
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the 10 device interface module 62 and/or the memory interface modules may be collectively or individually referred to as 10 ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17.

Figure 3:
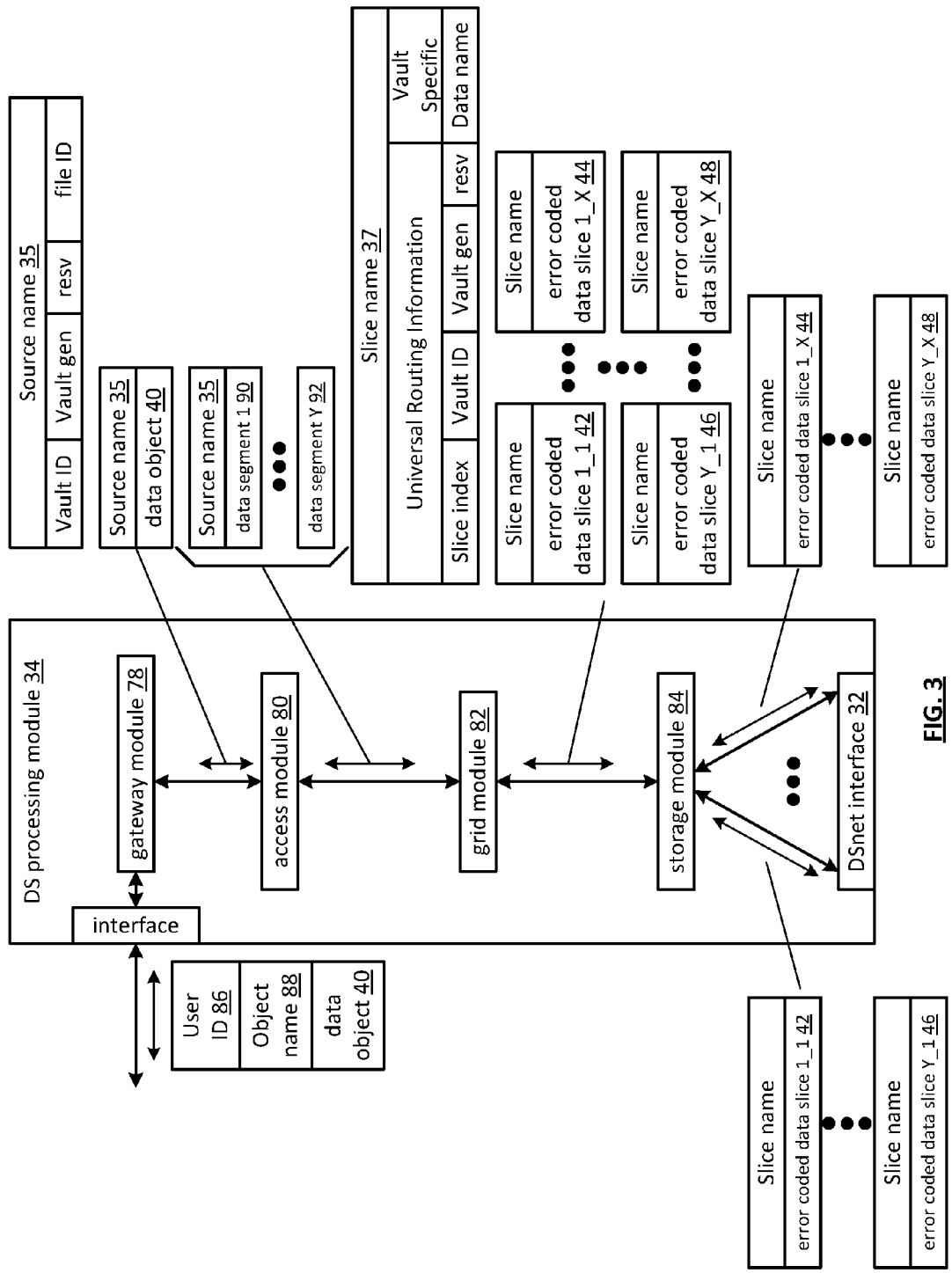
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
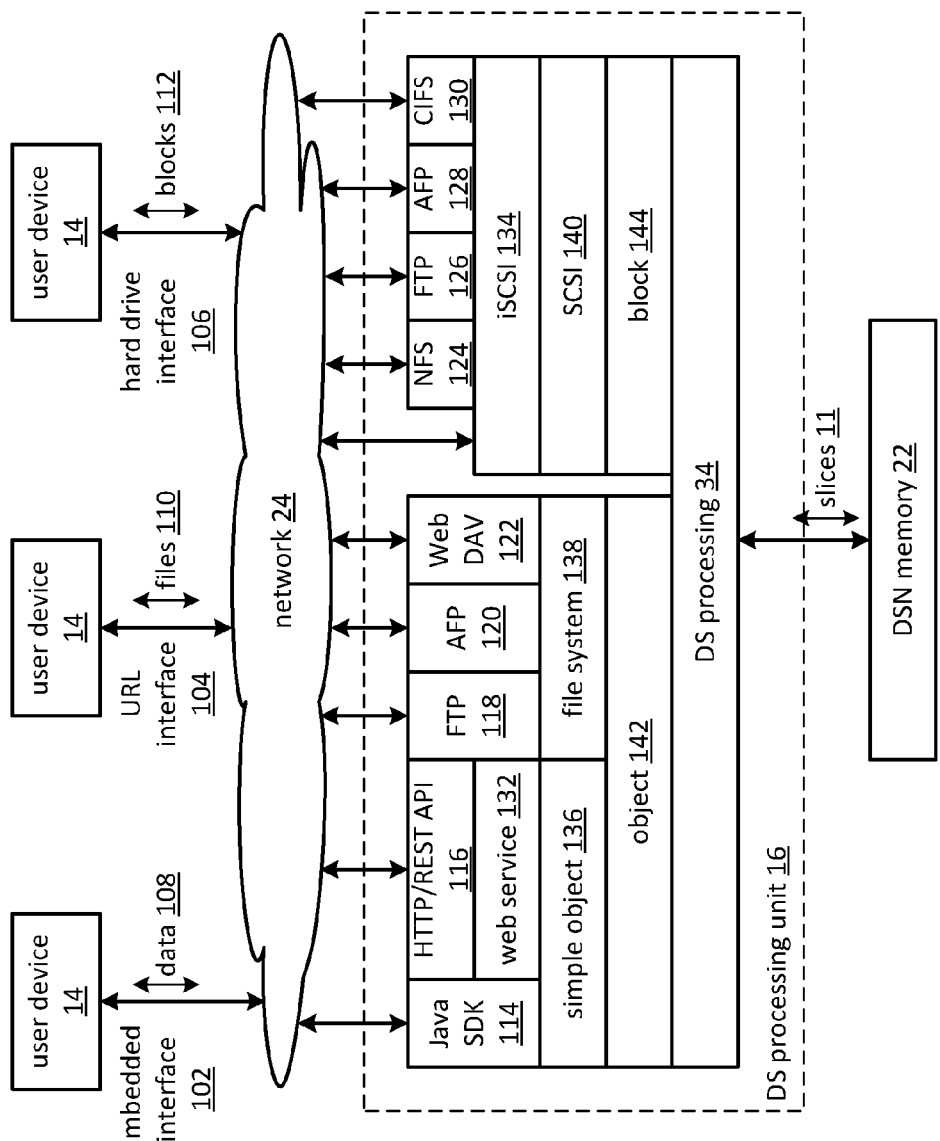
FIG. 6 is another schematic block diagram of another embodiment of a computing system in accordance with the invention.

FIG. 6 is another schematic block diagram of another embodiment of a computing system. As illustrated, the system includes a plurality of user devices 14, a network 24, a dispersed storage (DS) processing unit 16, and a dispersed storage network (DSN) memory 22. Note that the DSN memory 22 may be operably coupled to the DS processing unit 16 directly or via the network 24. As illustrated, the DS processing unit 16 includes a DS processing 34 and a plurality of functional layers to enable the DS processing 34 to interface with the plurality of user devices 14. As illustrated, functional layers interface with other functional layers above and below the functional layer converting one set of protocols and/or procedures to the next as discussed in more detail below.

As illustrated, there are at least two primary methods to interface the plurality of user devices 14 to the DS processing 34. A first primary method is an object method and a second primary method is a block method. In the object method, data is interchanged in the form of an object that may have variable size, name(s), directory links, and metadata. Object storage includes a sequence of bytes of a varying length to help abstract the physical storage (e.g., object names rather than just disk drive locations). User devices can add/delete bytes of an object. The object may have attached metadata describing the data. This layer looks like an object storage device to the above layers. For example, different size files and/or data associated with a client/server application. In the block method, data is interchanged in the form of fixed length blocks. Block storage utilizes a sequence of bytes of a nominal length to help abstract the physical storage (e.g., block numbers rather than just disk drive locations). Files may be converted to blocks such that files typically fill multiple blocks. The block storage system can be abstracted by a file system for the user device.

Within the object method there are at least two secondary interfacing methods. A first secondary method is a simple object method and a second secondary method is a file system method. In the simple object method, data is interchanged that may not conform to a typical computer file and directory system. Simple objects include data without a file structure such as bytes exchanged in an embedded client with a server application. Simple objects may be communicated in messages via HTTP. Simple objects may utilize simple object access protocol (SOAP) procedures to exchange extensible markup language (XML) style documents. For example, location data exchanged between a global positioning system (GPS) equipped user device and a location services application server. In the file system method, an approach is provided for storing and organizing data where the data is interchanged conforming to a typical computer file and directory system. In the file system, file names are assigned to files and organized in a directory. File name may be an index into a file allocation table (FAT) of location information. For example, a user device sends a Windows formatted file to the DSN system.

As illustrated, the DS processing unit 16 interfaces the DSN memory 22 to the plurality of user devices 14 through either an object layer 142 and/or a block layer 144. The object layer 142 interfaces with either a simple object layer 132 and/or a file system layer 138. As illustrated, the simple object layer 142 interfaces with either a Java SDK (software developer kit) layer 114 and/or a web service layer 132. In an example, the Java SDK layer 114 may utilize a loader to interpret Java class files generated by a Java compiler. For instance, a Java archiver may manage Java Archive (JAR) files. In an example, the web service layer 132 utilizes a protocol for machine to machine interaction over a network. For instance, the protocol includes a simple object access protocol (SOAP) standard over hypertext protocol (HTTP) or representational state transfer (REST). The web service layer 132 interfaces with a HTTP/REST API layer 116. In example, the REST API layer on 16 utilizes a client server approach with discrete states without a continuous server load (e.g., a request followed by a response with no state maintained by a server). Note that REST may run over HTTP.

As illustrated, the file system layer 138 interfaces with either a FTP (file transfer protocol) layer 118, an AFP (Apple Filing Protocol) layer 120, and/or a Web DAV (web based distributed authoring and versioning) layer 122. In example, the FTP layer 118 is utilized to exchange files over transport control protocol/internet protocol (TCP/IP) such as the internet via ports. For instance, FTP utilizes a client server approach. For instance, FTP may utilize separate control and data streams and applications may be command line or graphical. Note that a secure sockets layer (SSL) and/or transport layer security (TLS) may be added for improved security. In an example, the AFP layer 120 provides a network protocol of file services for the Macintosh operating system (OS) family over TCP/IP. In an example, the Web DAV layer 122 provides extensions to HTTP to allow the plurality of user devices 14 to create, change, and/or move files on a web server. For instance, Windows OS provides directory web folders.

As illustrated, the block layer of 44 interfaces with a SCSI (small computer system interface) layer 140. In an example, the SCSI layer 140 provides a bus approach physical connection and data transfer between computers and peripheral devices. For instance, SCSI enables initiators (e.g., in user device) to send commands to targets (e.g., in DS processing unit and/or DS memory). The SCSI layer 140 interfaces with an iSCSI (internet small computer system interface) layer 134. In an example, the iSCSI layer 134 transfers SCSI commands over the internet and/or the network 24 via TCP/IP enabling remote initiators (e.g., in user device 14) to send commands to targets (e.g., in DS processing unit 16 and/or DS unit 36).

As illustrated, the iSCSI layer 134 interfaces with a NFS (network file system) layer 124, a FTP layer 126, an AFP layer 128, a CIFS (common internet file system) layer 130, and/or directly with the user device 14. In example, the NFS layer 124 enables user devices access over a network 24 where the DS processing unit 16 implements a NFS daemon process to make data available to a plurality of user devices 14. For instance, directories are communicated as user device 14 requests a mount. In an example, the CIFS layer 130 provides a client server application layer network protocol to provide shared access to files, printers, serial ports (e.g., common in Windows OS). The FTP layer 126 and AFP layer 128 function as previously discussed.

In an example of operation, the user device 14 utilizes an embedded interface 102 to store data 108 in the DSN memory 22. A user device data application communicates REST transfers via HTTP over the network to the HTTP/REST API interface layer 116. The web service layer 132 may host the server side of the REST transfers. The object layer 142 interfaces the data to the DS processing 34 where the data is segmented, encoded, and sliced in accordance with an error coded dispersal storage function to produce encoded data slices 11. The DS processing 34 sends the encoded data slices 11 to the DSN memory 22 for storage therein.

In another example of operation, the user device 14 utilizes a URL interface (uniform resource locator) 104 to store a file 110 in the DSN memory 22. A user device file application communicates Web DAV transfers via HTTP over the network 24 to the Web DAV interface layer 122. The Web DAV interface 122 may provide web folders to the user device 14 such that the user device 14 may drop the file 110 to be stored in the DSN memory 22 into the folder. The file system layer 138 and the object layer 142 interfaces data of the file 110 to the DS processing 34 where the data is segmented, encoded, and sliced in accordance with an error coded dispersal storage function to produce encoded data slices 11. The DS processing 34 sends the encoded data slices 11 to the DSN memory 22 for storage therein.

In another example of operation, the user device 14 utilizes a hard drive style interface 106 to store data blocks 112 in the DSN memory 22. A user device block application communicates CIFS transfers over the network 24 to the CIFS interface layer 130. The CIFS interface layer 130 may provide shared access to the user device 14 such that the user device when 14 looks at the DSN memory 22 as an iSCI device to store data blocks 112 in the DSN memory 22. The iSCSI 134 and SCSI layer 140 interfaces data of the data blocks 112 to the DS processing 34 where the data is segmented, encoded, and sliced in accordance with an error coded dispersal storage function to produce encoded data slices 11. The DS processing 34 sends the encoded data slices 11 to the DSN memory 22 for storage therein.

Figure 7:
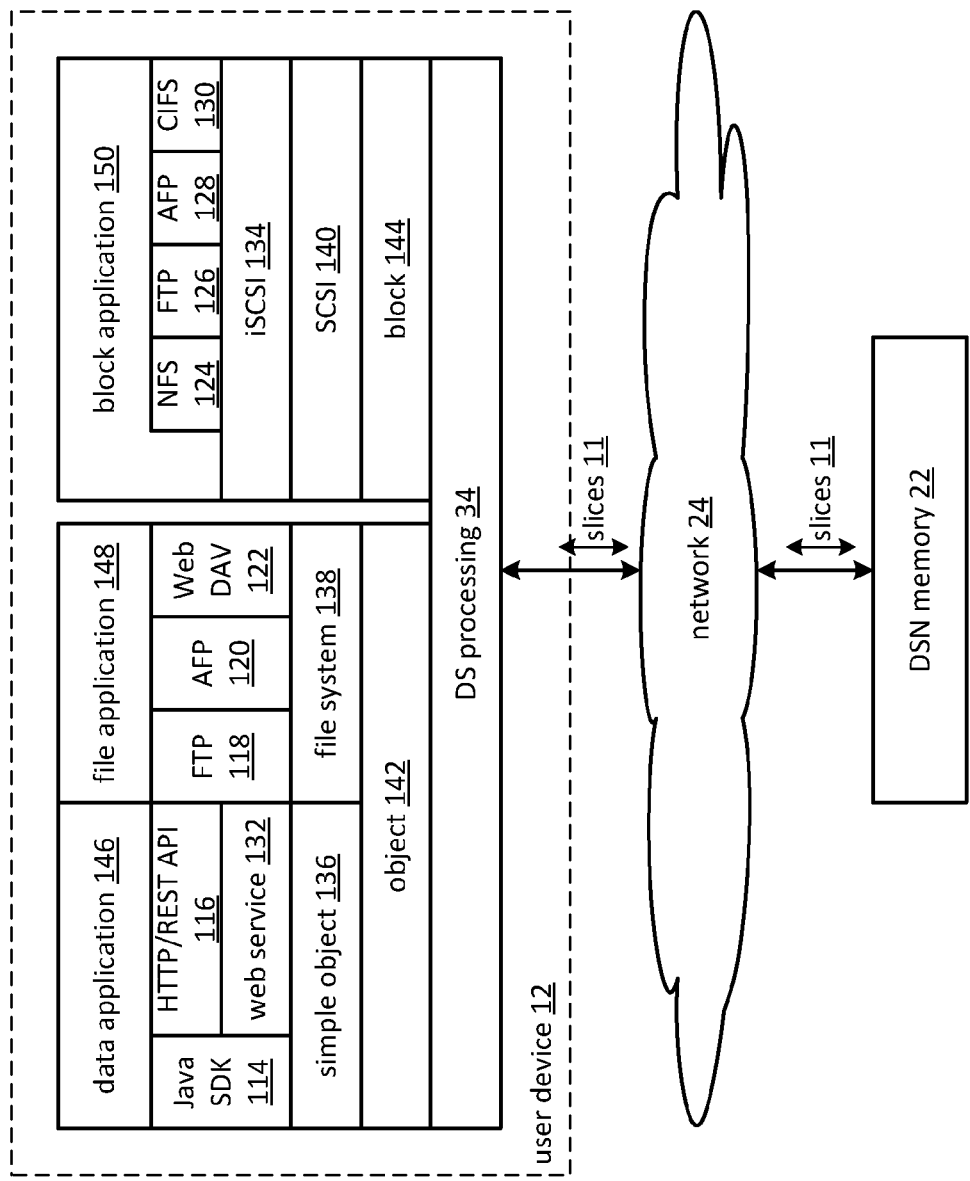
FIG. 7 is another schematic block diagram of another embodiment of a computing system in accordance with the invention.

FIG. 7 is another schematic block diagram of another embodiment of a computing system. As illustrated, the system includes a user device 12, a network 24, and a DSN memory 22. As illustrated, the user device 12 includes a plurality of functional layers including a DS processing 34 where the DS processing 34 interfaces with the DSN memory 22 and a plurality of interfacing functions 114-144 that interface with a plurality of applications 146-150. The interfacing functions 114-144 operate as discussed with reference to FIG. 6.

There are at least two primary interfacing methods from the DS processing 34 to the applications 146-150. A first primary method is an object method and a second primary method is a block method as previously discussed with reference to FIG. 6. As illustrated, a data application 146 interfaces with the Java SDK layer 114 and/or HTTP/REST API layer 116 interfacing functions. As illustrated, a file application 148 interfaces with a FTP layer 118, an AFP layer 120, and/or a Web Day layer 122 interfacing functions. As illustrated, a block application 150 interfaces with a NFS layer 124, a FTP layer 126, an AFP layer 128, a CIFS layer 130, and/or directly with an iSCSI layer 134. In another example, the applications 146-150 may interface directly with one or more of a web service layer 132, a simple object layer 136, a file system layer 138, the iSCSI layer 134, an object layer 142, and a block layer 144.

The applications 146-150 may utilize protocols (e.g., above the physical layer) of the interfacing functions 114-144 to access the DSN memory 22. The data application 146 communicates data with the DS processing 34 to access the DSN memory 22. The file application 148 communicates files with the DS processing 34 to access the DSN memory 22. The block application 150 communicates data blocks with the DS processing 34 to access the DSN memory 22. The DS processing sends slices 11 through the network 24 to the DSN memory 22 for storage therein. The DS processing 34 retrieves slices 11 from the DSN memory 22 through the network 24.

Figure 8:
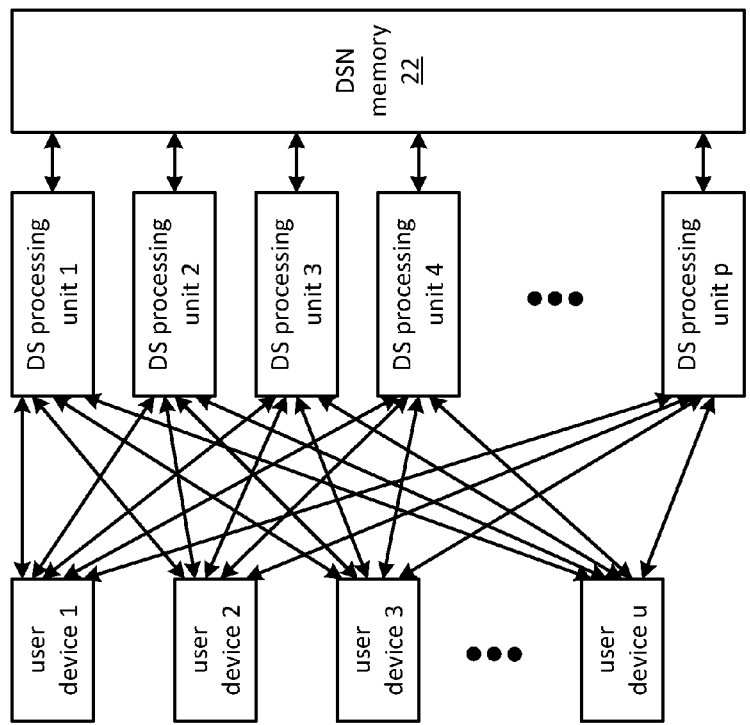
FIG. 8 is another schematic block diagram of another embodiment of a computing system in accordance with the invention.

FIG. 8 is another schematic block diagram of another embodiment of a computing system. As illustrated, the system includes a plurality of user devices 1-$u$, a plurality of DS processing units 1-$p$, and a DSN memory 22. In an example of operation, the user device 1 may determine a DS processing unit 3 to utilize based on matching DS processing unit attributes to DS processing unit requirements. In another example, user device 2 determines to utilize DS processing unit 3 when DS processing unit 3 has the most favorable availability history of the plurality of DS processing units 1-$p$ and DS processing unit 3 is expected to continue to be available at a level that compares favorably with the user device 2 DS processing unit requirements.

In another example of operation, the user device 6 may determine a DS processing unit 5 to utilize based on a predetermination and/or initially on a predetermination followed by a potential subsequent modification based in part on actual performance. In another example, user device 3 determines to initially utilize DS processing unit 1 when DS processing unit 1 is listed in a predetermined table. Next, user device 3 determines to subsequently utilize DS processing unit 2 when DS processing unit 1 does not perform to a required level and DS processing unit 2 is the second choice.

In an example of operation, user device 7 provides DSN memory access authorization credentials when accessing the DSN memory 22 via DS processing unit 10. Next, the DS processing unit 10 verifies the authorization credentials. The DS processing unit 10 forwards a DSN memory access request to the DSN memory 22 when the authorization credential verification is favorable (e.g., on a list of authorized users for the particular item in the DSN memory 22). The DS processing unit 10 does not forward a DSN memory access request to the DSN memory 22 when the authorization credential verification is not favorable (e.g., not on a list of authorized users for the particular item in the DSN memory 22). The method of operation of the user device 1-$u$ to determine the DS processing unit 1-$p$ is discussed in greater detail with reference to FIG. 9.

In another sample, DS processing unit 3 forwards the authorization credentials to the DSN memory 22 with the DSN memory access request (e.g., without verification by the DS processing unit 3). The DSN memory 22 verifies the authorization credentials. The DSN memory 22 processes the memory access request when the authorization credential verification is favorable. The DSN memory 22 does not process the memory access request when the authorization credential verification is not favorable.

Figure 9:
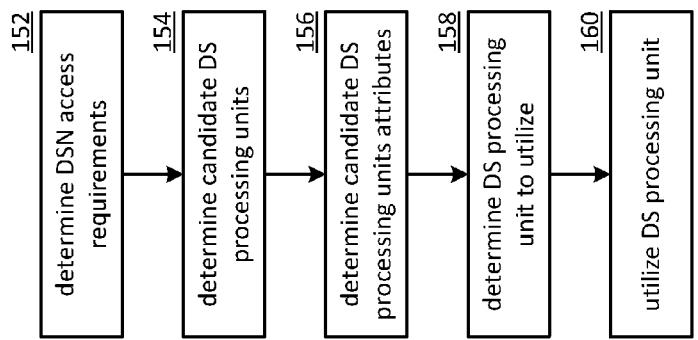
FIG. 9 is a flowchart illustrating an example of selecting a dispersed storage (DS) processing unit in accordance with the invention.

FIG. 9 is a flowchart illustrating an example of selecting a dispersed storage (DS) processing unit. The method begins at step 152 where a processing module (e.g., of a user device) determines dispersed storage network (DSN) memory access requirements. The requirements may include one or more of security requirements, performance requirements, and priority requirements. Such a determination may be based on one or more of a query, a data type, a data size, a security indicator, a performance indicator, a command, a predetermination, and a lookup.

The method continues at step 154 where the processing module determines candidate DS processing units based on one or more of a virtual DSN address to physical location table, a query, a message from one or more DS processing units, a data type, a data size, a security indicator, a performance indicator, a status indicator, a command, a predetermination, and a lookup. The method continues at step 156 where the processing module determines candidate DS processing units attributes where the attributes may include one or more of current capacity, current loading, uptime history, performance history, data types supported, data types not supported, security restrictions, and encryption algorithms supported. Such a determination may be based on one or more of a virtual DSN address to physical location table, a query, a message from one or more DS processing units, a data type, a data size, a security indicator, a performance indicator, a command, a predetermination, and a lookup. In an example, the processing module determines that DS processing unit 1 has an attribute of capacity above a threshold based on the performance indicator. In another example, the processing module determines that DS processing unit 4 has an attribute of a particular encryption algorithm based on the security indicator from a query.

The method continues at step 158 where the processing module determines a DS processing unit to utilize based on one or more of the DSN access requirements, the candidate DS processing units, the candidate processing units attributes, a comparison of the candidate processing units attributes to the DSN access requirements, a virtual DSN address to physical location table, a query, a message from one or more DS processing units, a data type, a data size, a security indicator, a performance indicator, a command, a predetermination, and a lookup. In an example, the processing module determines the DS processing unit such that substantially all of the requirements are met or exceeded. For instance, the processing module determines the DS processing unit that meets or exceeds the most requirements. The method continues at step 160 where the processing module utilizes the determined DS processing unit for the DSN access (e.g., store, retrieve, delete, check status).

Figure 10B:
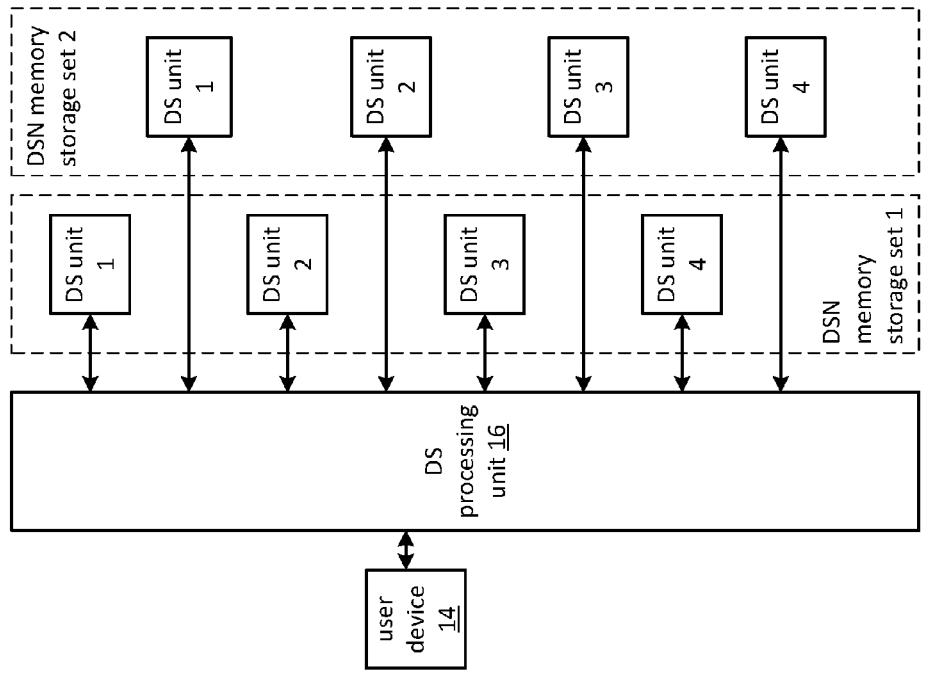
FIG. 10B is another schematic block diagram of another embodiment of a computing system in accordance with the invention.
Figure 10A:
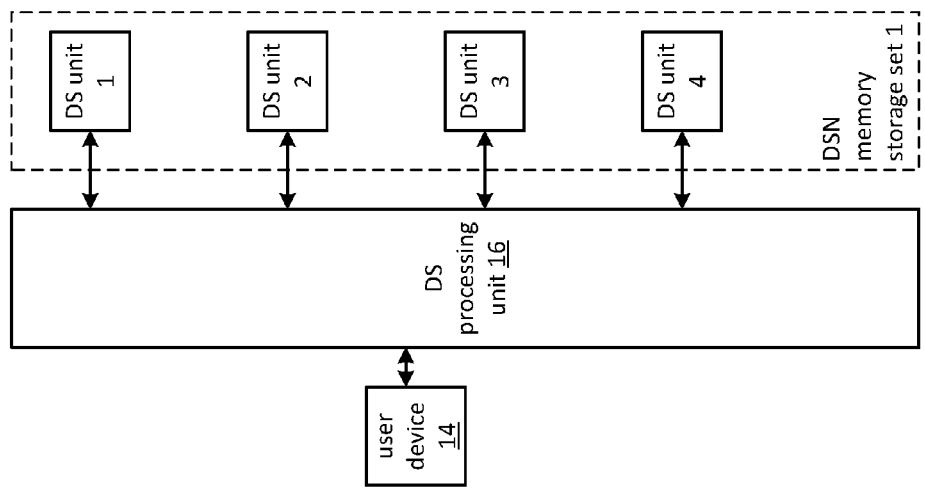
FIG. 10A is another schematic block diagram of another embodiment of a computing system in accordance with the invention.

FIG. 10A is another schematic block diagram of another embodiment of a computing system and FIG. 10B is another schematic block diagram of another embodiment of a computing system. As illustrated in FIG. 10A, the system includes a user device 14, a dispersed storage (DS) processing unit 16, and a dispersed storage network (DSN) memory storage set 1. The system of FIG. 10B includes the user device 14, the DS processing unit 16, the DSN memory storage set 1, and a DSN memory storage set 2 (e.g., to affect capacity expansion). As illustrated, the DSN memory storage sets 1 and 2 include a plurality of dispersed storage (DS) units 1-4 to accommodate a vault with a pillar width n=4. For instance, pillar 1 slices are stored in DS unit 1, pillar 2 slices are stored in DS unit 2, pillar 3 slices are stored in DS unit 3, and pillar 4 slices are stored in DS unit 4. Note that the DSN memory storage sets 1 and 2 may include any number of DS units.

In an example of operation, the DS processing unit 16 determines if memory utilization of DSN memory storage set 1 is above a threshold (e.g., when the memory utilization is greater than or equal to 70% utilized). Such a determination may be based on one or more of a query of one or more of the DS units 1-4 of the DSN memory storage set 1, a message from a DS managing unit, and/or a message from the DSN memory storage set 1. Next, the DS processing unit 16 sends a memory utilization alert to the DS managing unit when the DS processing unit 16 determines that the memory utilization is above the threshold. In addition, the DS processing unit 16 may activate a dormant DSN memory storage set as DSN memory storage set 2 to provide more storage capacity for at least one vault that is utilizing DSN memory storage set 1.

In another example of operation, the DS processing unit 16 determines which of the two storage sets to utilize when the DS processing unit 16 has new data to send to the DSN memory for storage. As illustrated in FIG. 10B, DSN memory storage set 2 has the same number of DS units as DSN memory storage set 1. In another example, DSN memory storage set 2 may include two or more DS units for each pillar.

In another example of operation, the DS processing unit 16 determines to send pillar 1 slices to DS unit 1 of DSN memory storage set 2. In another example, the DS processing unit 16 determines to send pillar 1 slices to DS unit 1 of DSN memory storage set 1. Note that DSN memory storage set 1 may be nearly full while DSN memory storage set 2 may be nearly empty. In another example of operation, the DS processing unit 16 balances distribution of new data between the two DSN memory storage sets to achieve a balancing objective. For instance, the balancing objective may include completely filling DSN memory storage set 1 followed by sending subsequent data to DSN memory storage set 2. In another instance, the balancing objective may include alternating sending new data to the DSN memory storage sets such that DSN memory storage set 1 fills up to capacity first. In yet another instance, the balancing objective may include alternating sending new data to the DSN memory storage sets such that the DSN memory storage sets fill up to capacity substantially simultaneously. The DS processing method to balance the utilization is discussed in greater detail with reference to FIG. 11.

Figure 11:
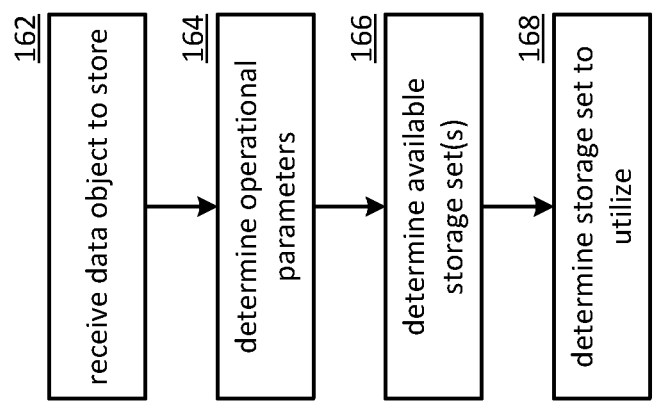
FIG. 11 is a flowchart illustrating an example of determining a dispersed storage (DS) unit storage set in accordance with the invention.

FIG. 11 is a flowchart illustrating an example of determining a dispersed storage (DS) unit storage set. The method begins at step 162 where a processing module (e.g., of one of a dispersed storage (DS) processing unit, a user device, a dispersed storage (DS) managing unit, a storage integrity processing unit, or a dispersed storage (DS) unit) receives a store data object message (e.g., from one of the user device, the DS processing unit, the DS managing unit, the storage integrity processing unit, or the DS unit). Such a store data object message may include one or more of a data object, a command, a user ID, a data object name, a data type, a data size, a priority indicator, a security indicator, a performance indicator, and other metadata.

The method continues at step 164 where the processing module determines operational parameters based on one or more of the data object, a vault lookup, a query of dispersed storage network (DSN) memory storage set memory utilization, a command, a user ID, a data object name, a data type, a data size, a priority indicator, a security indicator, a performance indicator, and other metadata. For example, the processing module determines that the pillar width is four based on the user ID. The method continues at step 166 where the processing module determines available DSN memory storage set(s) based on one or more of a query, the operational parameters, a vault lookup, a predetermination, a query of DSN memory storage set memory utilization, a command, a user ID, a data object name, a data type, a data size, a priority indicator, a security indicator, a performance indicator, and other metadata. For example, the processing module determines that DSN memory storage sets 1 and 2 are available based on a query.

The method continues at step 168 where the processing module determines a DSN memory storage set to utilize based on one or more of the available storage set(s), a balancing objective, a query, the operational parameters, a vault lookup, a predetermination, a random number, a query of DSN memory storage set memory utilization, a command, a user ID, a data object name, a data type, a data size, a priority indicator, a security indicator, a performance indicator, and other metadata. In an example, the processing module determines that the balancing objective is to alternate sending new data to the available DSN memory storage sets such that the DSN memory storage sets fill up to capacity substantially simultaneously and that available DSN memory storage set 1 has 30% capacity remaining and DSN memory storage set 2 has 95% capacity remaining. For instance, the processing module determines a random number from 1 to 125 (e.g., 30+95=125). Next, the processing module encodes the data object in accordance with an error coding dispersal storage function to produce encoded data slices. The processing module sends the encoded data slices to DSN memory storage set 1 for storage therein when the random number is less than or equal to 30. The processing module sends the encoded data slices to DSN memory storage set 2 for storage therein when the random number is greater than 30. Note that this weighted method balances the utilization to meet the balancing objective.

FIG. 12A is a schematic block diagram of an embodiment of a dispersed storage network (DSN) memory and FIG. 12B is another schematic block diagram of another embodiment of a dispersed storage network (DSN) memory. As illustrated in FIG. 12A, the DSN memory includes a dispersed storage (DS) unit 1 at site 1. As illustrated, DS unit 1 includes a storage unit control module 170 and a plurality of memories 1-12. The storage unit control module 170 may be implemented with the computing core 26 of FIG. 2. The memories 1-12 may be implemented by one or more of a magnetic hard disk, NAND flash, read only memory, optical disk, and/or any other type of read-only, or read/write memory. The memories may be implemented as part of or outside of the DS unit 1. For example, memories 1-4 may be implemented in the DS unit 1 and memories 5-12 may be implemented in a remote server (e.g., a different DS unit operably coupled to the DS unit 1 via the network 24). In another example, memories 1-8 are implemented with the magnetic hard disk technology and memories 9-12 are implemented with the NAND flash technology.

As illustrated in FIG. 12B, the DSN memory includes the DS unit 1 at site 1 and a DS unit 2 at site 2 at a time subsequent to that of FIG. 12A. As illustrated, DS unit 1 includes the storage and control module 170 and memories 1-6. As illustrated, DS unit 2 includes the storage unit control module 170 and memories 7-12. Note that memories 1-12 are transportable such that memories 7-12 were transferred to DS unit 2 while memories 1-6 remain in DS unit 1.

As illustrated, the storage unit control module 170 is operably coupled to the computing system via the network 24. The storage unit control module 170 may include DS processing 34 and may receive, via the network, a store command, metadata, and a data object to store. Note that the DS unit access may be via a WebDAV sequence, e.g., via an IP address such as http://21.8.44/vault1 to facilitate easy DS unit access. The data object may include a simple object file, a block file, and/or EC data slices. In an example, the storage unit control module 170 stores the data object in one or more of the memories 1-12 substantially as received (e.g., a slice is stored as a slice, a block file is stored as a block file, etc.). In another example, the storage unit control module 170 encodes the data object utilizing an error coding dispersal storage function to produce encoded data slices and stores the encoded data slices in one or more of the memories 1-12. Note that the storage unit control module unit may determine to utilize only the memories 1-12 of the DS unit 1 when the capabilities of memories 1-12 substantially meet the requirements. In another example, the storage unit control module 170 determines to utilize some combination of the memories 1-12 of the DS unit and memory of at least one other DS unit when the capabilities of memories 1-12 alone substantially do not meet the requirements.

In an example of operation, the storage unit control module 170 determines where (e.g., which address of one or more of the memories) to store the received data object as encoded data slices. Such a determination may be based on one or more of metadata, a command (e.g., from the DS processing unit indicating which memory or memory type to use), a type of data indicator, a local virtual DSN address to physical location table lookup, a priority indicator, a security indicator, available memory, memory performance data, memory status, memory cost data, and any other parameter to facilitate desired levels of efficiency and performance. For instance, the storage unit control module 170 may select memories 1-12 (e.g., magnetic hard disk drives) to store the encoded data slices since the performance and efficiency is good enough for the requirements (e.g., availability, cost, response time). In another instance, the storage unit control module 170 distributes the slices to memories 1-10 when memories 11 and 12 are not available. In another instance, the storage unit control module 170 distributes the slices at various addresses across one memory. In another instance, the storage unit control module 170 distributes a read threshold k=8 of the encoded data slices across memories 1-8 (for fast retrieval) and the other 4 (n-k) encoded data slices to other DS units. In yet another instance, the storage unit control module 170 distributes the encoded data slices across the DS unit memories and at least one other DS unit at the same site as the DS unit 1. In yet another instance, the storage unit control module 170 distributes the encoded data slices across the DS unit memories and at least one other DS unit at a different site as the DS unit 1.

In a further example of operation, the storage unit control module 170 creates and maintains a local virtual DSN address to physical memory table. The storage unit control module 170 determines where previously stored encoded data slices are located based on the local virtual DSN address to physical memory table upon receiving a retrieve request via the network 24. Note that a DS processing unit operably coupled to the DS unit 1 via the network, maintains a virtual DSN address to physical memory table for the system tracking where the pillars are located for each vault.

In the example of operation, the storage unit control module 170 determines when a change has occurred to the memory configuration of the DS unit 1 and updates the local virtual DSN address to physical memory table (e.g., DS unit level) and sends a configuration update message to the DS processing unit to update the virtual DSN address to physical memory table (e.g., system level) based on the memory configuration change. The storage unit control module 170 determines when a change has occurred to the memory configuration of the DS unit 1 based on one or more of a configuration message from the DS managing unit, a memory query, a test, an error message, a configuration indicator, a command, a vault lookup, a command, a predetermination, and a DS unit message. For instance, the storage unit control module 170 of DS unit 1 in FIG. 12B determines that a change (e.g., memory 7-12 has been removed, which is utilized to store pillars 7-12 of vault 301) has occurred based on a query of the memories 1-12.

In another instance, any number of pillars may be moved (e.g., via memory transport) from one DS unit to another. In another instance, the storage unit control module 170 of DS unit 2 in FIG. 12B determines that a change (e.g., memory 7-12 has been added which holds slices from pillars 7-12 of vault 301) has occurred based on a query of the memories 1-12 and a DS managing unit configuration message. Next, storage unit control module 170 of DS unit 1 in FIG. 12B updates its associated local DSN address to physical location table and send a configuration update message to the DS processing unit where the message includes an indication that pillars 1-6 (e.g., of a vault 301) are stored in DS unit 1 and/or pillars 7-12 are not stored in DS unit 1. The storage unit control module 170 of DS unit 2 in FIG. 12B updates its associated local DSN address to physical location table and send a configuration update message to the DS processing unit where the message includes an indication that pillars 7-12 (e.g., of vault 301) are stored in DS unit 2. The DS processing unit utilizes the DS units to access the pillars of the new configuration. The DS units provide slice access for the pillars of the new configuration.

Figure 13:
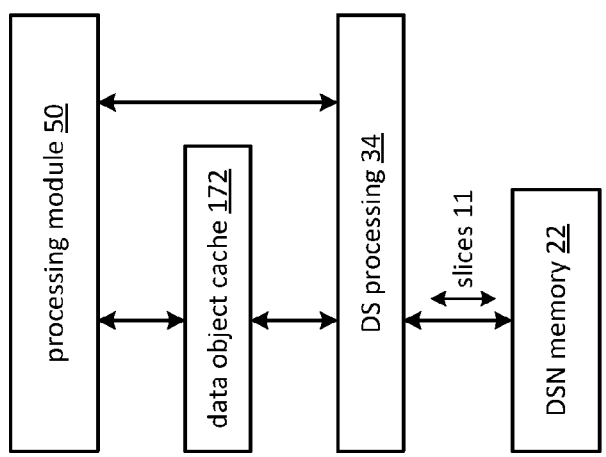
FIG. 13 is another schematic block diagram of another embodiment of a computing system in accordance with the invention.

FIG. 13 is another schematic block diagram of another embodiment of a computing system. As illustrated, the system includes a processing module 50 (e.g., hosting the file application), a data object cache 172, a DS processing 34, and a dispersed storage network (DSN) memory 22. In an implementation embodiment, the processing module 50, data object cache 172, and DS processing 34 may be implemented as part of a user device 12. In another implementation embodiment, the processing module 50 and data object cache 172 may be implemented as part of a user device 12 and the DS processing 34 may be implemented as part of a DS processing unit 16.

The processing module 50 may be part of the computing core 26 of FIG. 2 and may include memory to run a file application and store a working copy of a file. The processing module 50 may host a file application, which during a first timeframe manipulates a first portion of the file. In an example, the manipulation may include one or more of reading, editing, deleting, moving, inserting, replicating, and checking status. The file application may manipulate a second portion of the file during a second timeframe etc.

The data object cache 172 may comprise memory to temporarily store at least a portion of the file. The contents of the data object cache 172 may change frequently as the file is manipulated. The file may be deleted from the data object cache 172 once the manipulation sequences conclude. Portions of the file may be stored as slices 11 in the DSN memory 22 from time to time.

In an example of operation, DS processing 34 stores and/or retrieves slices 11 of the file in the DSN memory 22. For instance, the DS processing 34 determines to select at least a portion of the file, segment the portion, encode, and slice the portion to produce encoded data slices in accordance with an error coding dispersal storage function. Next, the DS processing 34 sends the encoded data slices to the DSN memory 22 for storage therein. In another instance, the DS processing 34 moves the portion of the file from the processing module 50 to the data object cache 172. The determination to save the portion in DSN memory 22 may be based on one or more of an action policy (e.g., when the file has changed), a query for change, a message from the processing module file application, and a timer expiration since the last save sequence. The method to determine if the data object has changed and what action to take when it has changed is described in greater detail with reference to FIG. 14.

Figure 14:
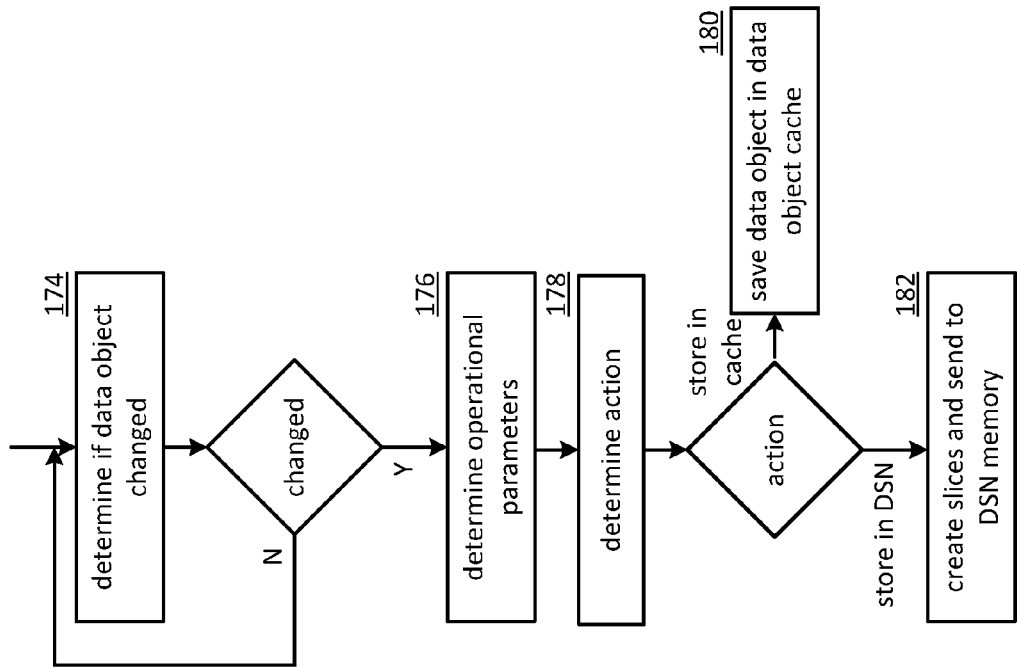
FIG. 14 is a flowchart illustrating an example of storing data in accordance with the invention.

FIG. 14 is a flowchart illustrating an example of storing data. The method begins with step 174 where a processing module determines if a data object has changed based one or more of a query for change, a message from the processing module file application, a change determination policy, a degree of change detection, a comparison of the file to a copy of the file in the data object cache, and a timer expiration since the last save sequence. For example, the processing module determines that the data object has not changed when a comparison of the file to the file previously stored in the data object cache (e.g., as a result of the last save sequence) reveals that less than a threshold of characters are different.

In another example, the processing module determines that the data object has changed when a comparison of the file to the file previously stored in the data object cache (e.g., as a result of the last save sequence) reveals that more than a threshold of characters are different and the timer from the last save sequence has expired. In another example, the processing module determines that the data object has changed when the processing module receives a message that the file has been closed (e.g., ending the file manipulation). The method repeats back to step 174 when the processing module determines that the data object has not changed. The method continues to step 176 when the processing module determines that the data object has changed.

The method continues at step 176 where the processing module determines operational parameters including pillar width n, read threshold k, and an action policy (e.g., what to do when change is determined). Such a determination may be based on one or more of a vault lookup, a command, a predetermination, and a message. The method continues at step 178 where the processing module determines an action, where the action may include storing a new copy of the file in the data object cache (e.g., in the file format and/or as encoded data slices) and/or storing a new copy, revision, or portion of the file in a dispersed storage network (DSN) memory as encoded data slices. Such a determination may be based on one or more of the action policy, the operational parameters, a data size indicator, a system activity level indicator, a vault lookup, a command, a message from the processing module, a predetermination, and a message. For example, the processing module determines the action to be stored in the data object cache when the action policy indicates to store the file in the cache when the data size is below a threshold.

In another example, the processing module determines the action to be stored in the DSN memory when the action policy indicates to store the file in the DSN memory when the system level activity level indicator is below a threshold. The method branches to step 182 when the processing module determines the action to be store in the DSN memory. The method continues to step 180 when the processing module determines the action to be store in the data object cache. The method continues at step 180 where the processing module saves the file in the data object cache in the file format. For instance, the processing module saves the entire file. In another instance, the processing module saves a portion of the file that has changed since the last save sequence. Note that the processing module may create encoded data slices from the file in accordance with the operational parameters and store the slices in the data object cache. The method continues at step 22 where the processing module encodes a portion of the file in accordance with an error coding dispersal storage function to produce encoded data slices. The processing module sends the encoded data slices to the DSN memory with an updated revision number and a store command for storage in the DSN memory.

Figure 15:
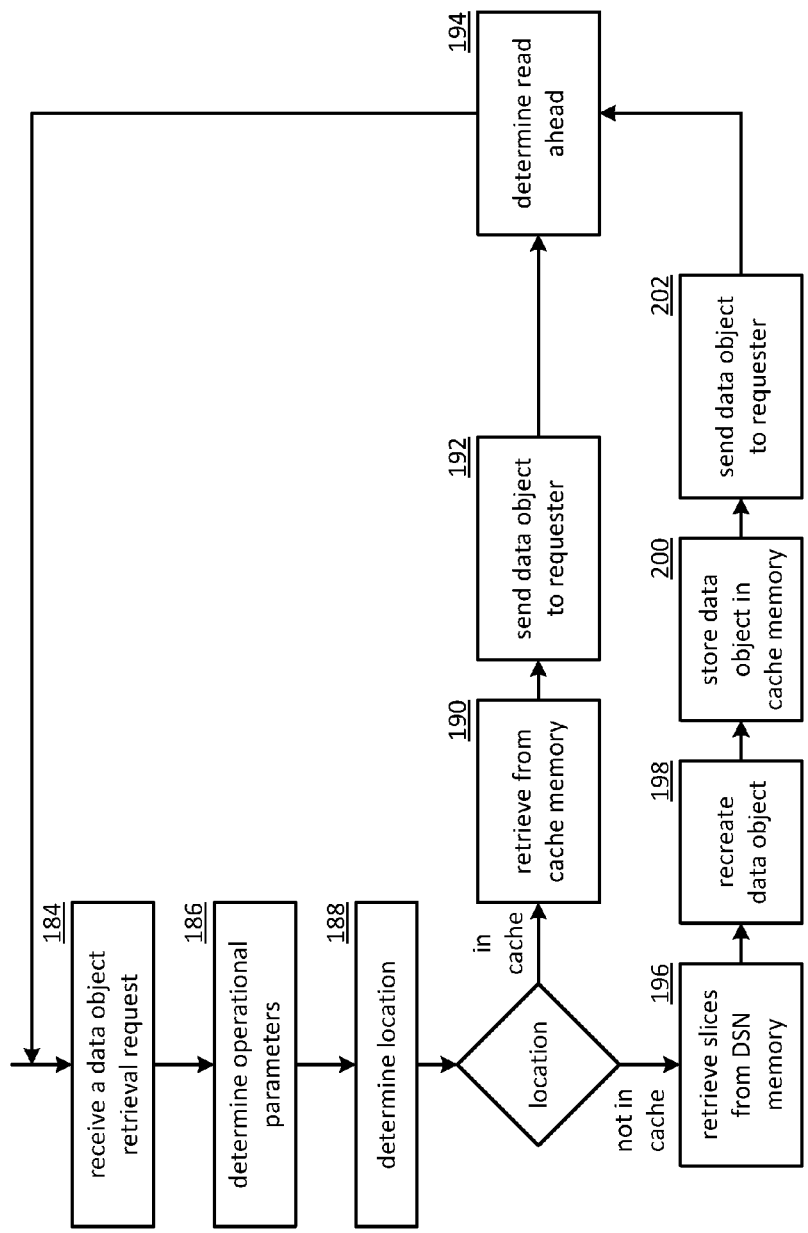
FIG. 15 is a flowchart illustrating an example of retrieving data in accordance with the invention.

FIG. 15 is a flowchart illustrating an example of retrieving data. The method begins with step 184 where a processing module receives a data object retrieval request message from a requester (e.g., an application that does not require the entire data object all at once including examples such as a media player, a text editor, etc.). Such a request may include one or more of a user ID, a data object name, a current position pointer (e.g., pointer within the data object), data object size, data type, a priority indicator, a security indicator, a performance indicator, a command, and a message.

The method continues at step 186 where the processing module determines operational parameters which may include one or more of pillar width n, read threshold k, and a cache list (e.g., which data object may be where in the data object cache). Such a determination may be based on one or more of a vault lookup, a command, a predetermination, a data object name, data object size, data type, a priority indicator, a security indicator, a performance indicator, a command, and a message.

The method continues at step 188 where the processing module determines a location of the data object which may include a data object cache and/or a dispersed storage network (DSN) memory. Such a determination may be based on one or more of the operational parameters, a cache list, a vault lookup, a command, a predetermination, a data object name, data object size, data type, a priority indicator, a security indicator, a performance indicator, a command, and a message. The method branches to step 196 when the processing module determines the location of the data object to be not in the cache. The method continues to step 190 when the processing module determines the location of the data object to be in the cache.

The method continues at step 190 where the processing module retrieves the data object from the cache memory in accordance with a cache list. In an example, the data object is stored as encoded data slices. The processing module de-slices and decodes the encoded data slices in accordance with an error coding dispersal storage function to produce the data object in accordance with the operational parameters when the data object is stored as encoded data slices. The method continues at step 192 where the processing module sends the data object to the requester. The method branches to step 194.

The method continues at step 196 where the processing module retrieves encoded data slices from the DSN memory in accordance with the operational parameters and/or location determination when the processing module determines the location of the data object to be not in the cache. The method continues at step 198 where the processing module de-slices and decodes the slices utilizing the error coding dispersal storage function and in accordance with the operational parameters to produce the data object. The method continues at step 200 where the processing module stores the data object in data object cache memory and modifies the cache list to indicate that the data object is stored in the cache. Note that this may provide an improvement to the system such that the subsequent retrievals may be from the cache (e.g., faster). The method continues at step 202 where the processing module sends the data object to the requester. The method branches to step 194.

The method continues at step 194 where the processing module determines a read ahead which may include an amount of the data object to retrieve next (e.g., which may be similar to the last retrieval if the consumption pace is steady or it may be none). Such a determination may be based on one or more of the amount of the data object retrieved for consumption so far, the current position pointer, a history of reading ahead, time since the last retrieval, the operational parameters, a cache list, a vault lookup, a command, a predetermination, a data object name, data object size, data type, a priority indicator, a security indicator, a performance indicator, a command, a system activity level indicator, and a message. For example, the processing module determines the read ahead to be 10 megabytes when the history of reading ahead indicates that the last five read ahead retrievals where 10 mega bytes and the average time between retrievals was 5 minutes. The method repeats back to step 184.

Figure 16:
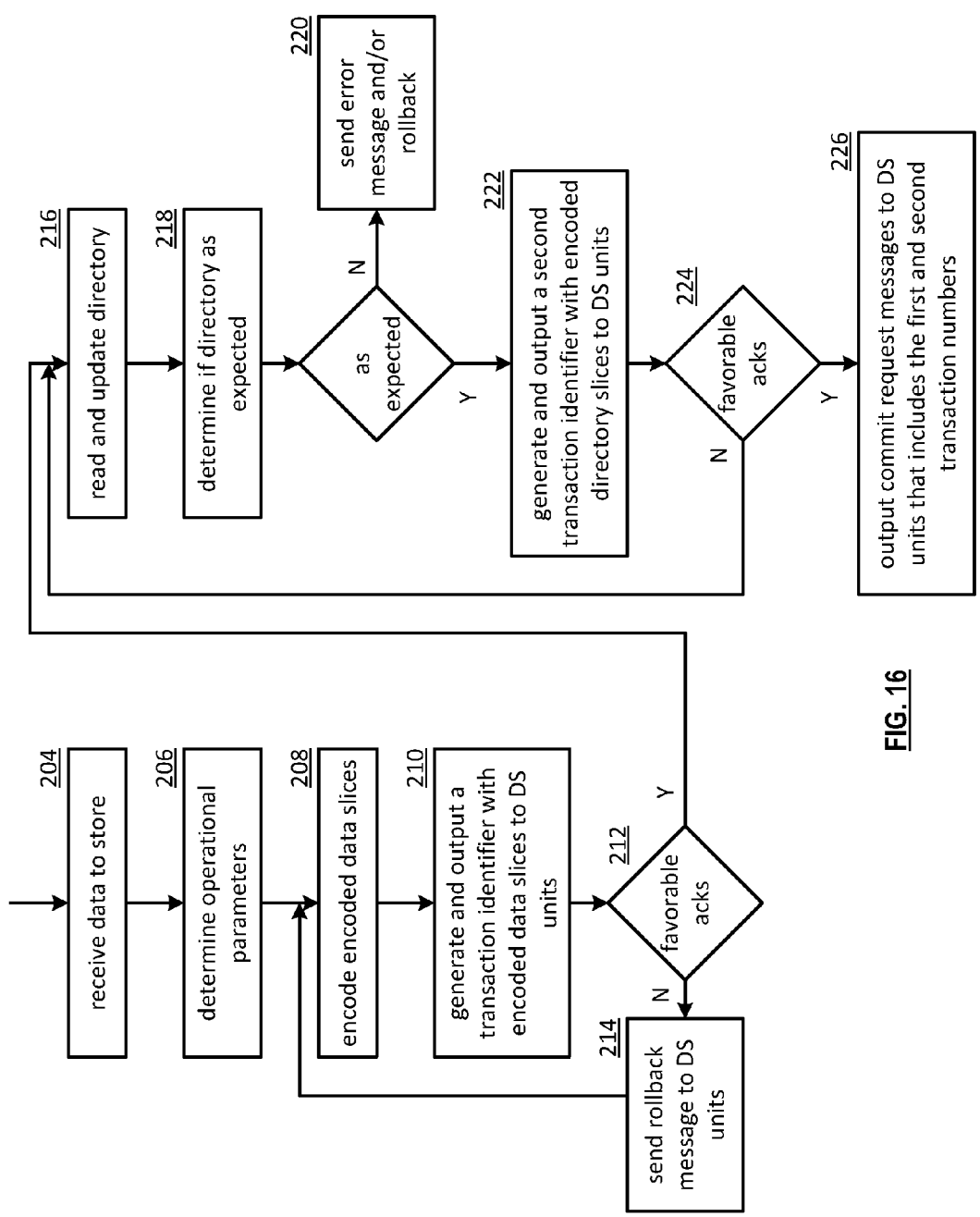
FIG. 16 is another flowchart illustrating another example of storing data in accordance with the invention.

FIG. 16 is another flowchart illustrating another example of storing data. The method begins with step 204 where a processing module (e.g., of a dispersed storage (DS) processing unit) receives a store data object message. The store data object message may include one or more of a command, a request, a user identity (ID), a data object name, a revision number, a data type, a data size, a priority indicator, a security indicator, a performance indicator, and metadata. The method continues at step 206 where the processing module determines operational parameters. Such operational parameters may include one or more of pillar width n, read threshold k, a write threshold (e.g., minimum number of pillars to confirm a successful write to confirm the store sequence), a transaction number, and identifiers of DS unit to utilize for storage. Such a determination may be based on one or more of a vault lookup, a virtual DSN address to physical location table lookup, a transaction number list, a last transaction number, a predetermination, a revision number, a query of DSN, a command, a user ID, a data object name, a data type, a data size, a priority indicator, a security indicator, a performance indicator, and other metadata. For example, the processing module determines that a first transaction number is 731 based on the last transaction number utilized was 730.

The method continues at step 208 where the processing module dispersed storage error encodes the data in accordance with the operational parameters to produce a set of encoded data slices. The method continues at step 210 where the processing module generates a first transaction identifier regarding storage of the set of encoded data slices. Note that the first transaction identifier may include a transaction number and/or a request number. Such a generation of the first transaction identifier may include at least one of utilizing a coordinated universal time, utilizing a random number generator output, performing a function (e.g., increment, decrement, multiply times 2, etc.) based on at least one of a previous first transaction identifier and a previous second transaction identifier, performing a second function on the first transaction identifier to generate the second transaction identifier.

The processing module outputs a plurality of write request messages to a plurality of dispersed storage (DS) units, wherein each of the plurality of write request messages includes the first transaction identifier and a corresponding one of the set of encoded data slices. One or more of the DS units may send a write response message (e.g., an acknowledgement) to the processing module in response to receiving the write request message. The processing module receives write response messages from the DS units. Note that the processing module may not receive an acknowledgement due to many potential errors and failures (e.g., DS unit failure, network failure, etc.).

The method continues at step 212 where the processing module receives write response messages from at least some of the DS units, wherein each of the write response messages includes a reference to the first transaction identifier. Note that a write response message of the write response messages comprises at least one of an operation succeeded status code, a transaction conflict status code (e.g., slice is locked by another transaction), an addressing error status code (e.g., slice is not assigned to a responding DS unit), a check condition status code (e.g., an expected revision does not match what is currently stored), and an unauthorized status code (e.g., a requester is not authorized to write the slice).

The processing module determines whether a write threshold number of favorable (e.g., with the operation succeeded status code) write response messages have been received within a time period. The method branches to step 216 when the processing module determines that the write threshold number of favorable write response messages have been received within the time period. The method continues to step 214 when the processing module determines that the write threshold number of favorable write response messages have not been received within the time period. Alternatively, the processing module determines that the write threshold number of favorable write response messages have not been received within the time period when the processing module receives at least one of the write response messages having an unfavorable response and, when a number of write response messages having the unfavorable response exceeds a second threshold. The method continues at step 214 where the processing module outputs a plurality of rollback transaction request messages to the plurality of DS units, wherein each of the plurality of rollback transaction request messages includes the first transaction identifier. Note that the DS unit deletes the encoded data slice, slice names, and first transaction identifier in response to receiving the rollback transaction request message. Next, the method branches back to step 208 where the processing module re-attempts to store the set of encoded data slices.

The method continues at step 216 where the processing module reads directory information associated with the data. Such directory information may link a data identifier and revision identifier to a virtual DSN address of the location where the encoded data slices are stored in the DS units of the dispersed storage network memory. In an example, the processing module retrieves encoded directory slices from the plurality of DS units and decodes the encoded directory slices utilizing an error coding dispersal stored function to produce the directory information. The processing module updates directory information regarding storage of the data to produce updated directory information. For example, the processing module modifies the revision identifier to indicate a newer revision has been stored for the corresponding data identifier.

The method continues at step 218 where the processing module determines if the directory information is as expected by one of more of comparing a transaction number of the last directory addition to an expected next transaction number (e.g., from the transaction number list) and by comparing the last entered data object name to the current data object name. Note that it is possible that another processing module is concurrently writing slices of a data object where the data object is targeted for the same directory position (e.g., a write collision). The method branches to step 222 when the processing module determines that the directory information is as expected. The method continues to step 220 when the processing module determines that the directory information is not as expected. The method continues at step 220 where the processing module sends an error message (e.g., to a dispersed storage managing unit), and may send a rollback request message to the morality of DS units, and may branch back to step 208 to re-create and re-store encoded data slices to avoid a potential write conflict.

The method continues at step 222 where the processing module dispersed storage error encodes the updated directory information to produce a set of encoded directory slices next.

Next, the processing module generates a second transaction identifier regarding storage of the set of encoded directory slices wherein generating the second transaction identifier includes at least one of utilizing a coordinated universal time, utilizing a random number generator output, performing a function based on at least one of a previous transaction identifier, a previous second transaction identifier, performing a second function on the first transaction identifier to generate the second transaction identifier. The processing module outputs a second plurality of write request messages to a second plurality of DS units, wherein each of the second plurality of write request messages includes the second transaction identifier and a corresponding one of the set of encoded directory slices. Alternatively, the processing module outputs the second plurality of write request messages to the plurality of DS units.

Alternatively, the processing module outputs a plurality of read request messages that includes a plurality of slice names corresponding to the updated directory information. Next, the processing module receives a plurality of read response messages that include a slice revision. Next, the processing module establishes the expected slice revision as the slice revision. Next, the processing module outputs the second plurality of write request messages to the plurality of DS units, wherein each of the second plurality of write request messages further includes the expected slice revision. The DS units may send an acknowledgement to the DS processing in response to receiving the data object name and second transaction number.

The processing module receives second write response messages (e.g., acknowledgements) from at least some of the plurality of DS units. Alternatively, the processing module interprets the second write response messages for confirmation of the expected slice revision. Note that the second write response message of the second write response messages comprises at least one of an operation succeeded status code, a transaction conflict status code, an addressing error status code, a check condition status code (e.g., the expected slice revision does not equal a current slice revision), and an unauthorized status code. Note that the processing module may not receive a second write response message due to many potential errors and failures (e.g., DS unit failure, network failure).

The method continues at step 224 where the processing module determines whether at least a second write threshold number of favorable (e.g., operation succeeded without error) second write response messages have been received from the DS units within a time period. The method branches back to step 216 where the processing module re-updates (e.g., re-reads and updates) the directory information regarding storage of the data, re-disperse error encodes the directory information to re-produce the set of encoded directory slices, and outputs at least some of the second plurality of write request messages regarding the reproduced set of encoded directory slices at step 222 to try again when the processing module determines that at least the second write threshold number of favorable second write response messages have not been received within a time period. The method continues to step 226 when the processing module determines that at least the second write threshold number of favorable second write response messages have been received.

The method continues at step 226 where the processing module outputs a plurality of data commit request messages regarding the set of encoded data slices to the plurality of DS units, wherein each of the plurality of data commit request messages includes the first transaction identifier. Next, the processing module outputs the plurality of directory commit request messages regarding the set of encoded directory slices to the second plurality of DS units, wherein each of the plurality of directory commit request messages includes the second transaction identifier. Alternatively, the processing module outputs a plurality of commit request messages regarding the set of encoded data slices and the set of encoded directory slices to the plurality of DS units, wherein each of the plurality of commit request messages includes the first and second transaction identifiers. Alternatively, the processing module outputs the plurality of commit request messages regarding the set of encoded data slices and the set of encoded directory slices to the plurality of DS units. The method of operation of the DS unit is discussed in greater detail with reference to FIG. 17.

Figure 17:
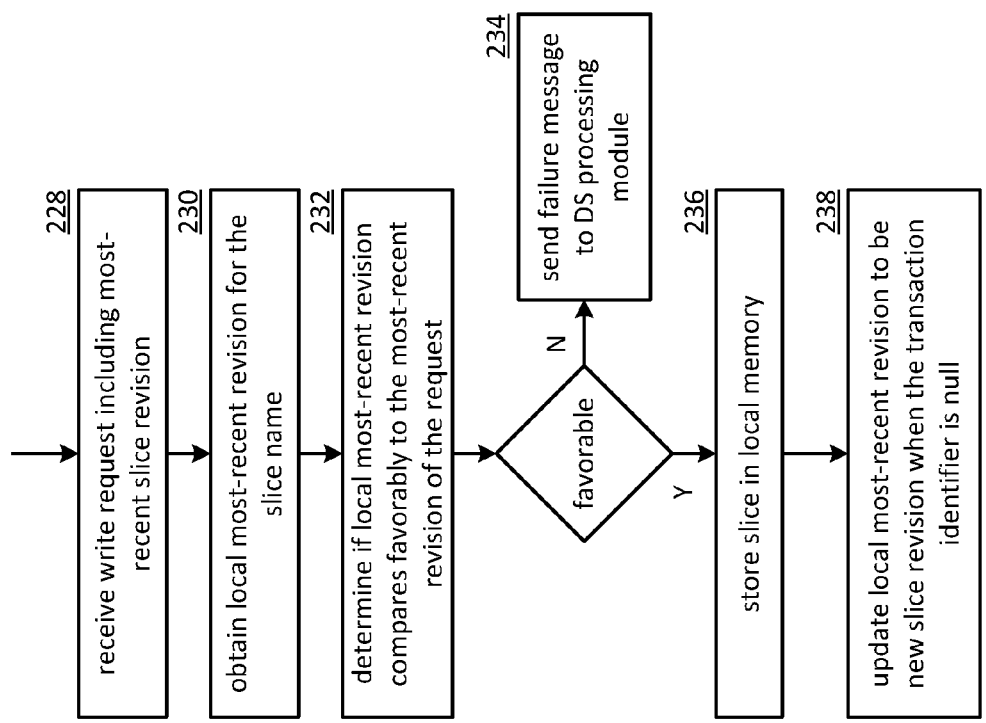
FIG. 17 is a flowchart illustrating an example of storing an encoded data slice in accordance with the invention.

FIG. 17 is a flowchart illustrating an example of storing an encoded data slice. The method begins with step 228 where a processing module (e.g., of a dispersed storage (DS) unit) receives a write request message from a dispersed storage (DS) processing module, wherein the write request message includes a slice name (e.g., of the slice to store), a DS processing module most-recent slice revision, a new slice revision (e.g., of the slice to store), and an encoded directory slice of directory information regarding storage of data. Note that DS processing module most-recent slice revision may be a revision number that the processing module of the DS unit previously sent to the DS processing module in response to a previous encoded directory slice query.

The method continues at step 230 where the processing module obtains a DS unit most-recent slice revision from local memory based on the slice name. The method continues at step 232 where the processing module determines whether the DS unit most-recent slice revision compares favorably to the DS processing module most-recent slice revision from the request. The processing module determines that the DS unit most-recent slice revision compares favorably to the DS processing module most-recent slice revision when the DS unit most-recent slice revision is substantially the same as the DS processing module most-recent slice revision. In addition, the processing module may check for other possible error conditions. In an example, the processing module verifies that the slice name is within a range that is assigned to the processing module (e.g., the DS unit). The processing module sends a write response message that includes an addressing error status code when the processing module determines that the slice name is not within the range. In another example, the processing module verifies that a requester that initiated the write request is authenticated and has an appropriate permissions level. The processing module sends a write response message that includes an unauthorized status code when the processing module determines that requester is not authenticated or does not have the appropriate permissions level.

The method branches to step 236 when the processing module determines that the DS unit most-recent slice revision compares favorably to the DS processing module most-recent slice revision. The method continues to step 234 when the processing module determines that the DS unit most-recent slice revision compares unfavorably to the DS processing module most-recent slice revision. The method continues at step 234 where the processing module generates a write response message to include a condition status code (e.g., a check condition status code) indicating the unfavorable comparison. Next, the processing module sends the write response message to the DS processing module.

The method continues at step 236 where the processing module stores the encoded directory slice. In addition, the processing module may generate a write response message that includes an operation succeeded status code. Next, the processing module sends the write response message to the DS processing module. The method continues at step 238 where the processing module stores the new slice revision as the DS unit most-recent slice revision when the transaction identifier is null. The processing module stores the new slice revision as the DS unit most recent slice revision when the transaction identifier is not null and a commit transaction message is subsequently received as discussed below.

Alternatively, or in addition to, the processing module receives the write request message, wherein the write request message further includes a DS processing module transaction identifier. Next, the processing module determines whether the slice name has a locked state based on a local state indicator. The processing module generates a write response message that includes a transaction conflict status code and sends the write response message to the DS processing module when the slice name has the locked state and a DS unit transaction indicator associated with the encoded directory slice compares unfavorably to the DS processing module transaction identifier. The processing module updates the local state indicator to indicate that the slice name has the locked state and stores the DS processing module transaction identifier as the DS unit transaction identifier when the slice name does not have a locked state.

In addition, the processing module may receive a commit transaction request message regarding storage of at least one of an encoded data slice and an encoded directory slice, wherein the commit transaction request message includes at least one transaction identifier. Next, the processing module identifies one or more slice names based on the at least one transaction identifier and for each of the one or more slices names, updates a slice status indicator to indicate the at least one of the encoded data slice and the encoded directory slice is visible. In addition, the processing module may update a current revision indicator associated with the slice name and transaction identifier to indicate a revision associated with the slice name. In addition, the processing module may update the slice status indicator to indicate that the slice name has an unlocked state subsequent to indicating that the at least one of the encoded data slice and the encoded directory slice is visible.

Alternatively, the processing module receives a commit transaction request message regarding storage of at least one of an encoded data slice and an encoded directory slice, wherein the commit transaction request message includes first and second transaction identifiers of the at least one transaction identifier, wherein the first transaction identifier is associated with the encoded data slice and the second transaction identifier is associated with the encoded directory slice. Next, the processing module updates a first slice status indicator to indicate that the encoded data slice is visible, and re-updates the first slice status indicator to indicate that the encoded data slice is not visible when a DS unit memory error exists. The processing module updates a second slice status indicator to indicate that the encoded directory slice is visible and re-updates the second slice status indicator to indicate that the encoded directory slice is not visible when the DS unit memory error exists.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a dispersed storage (DS) unit, the method comprises:
    receiving a write request message from a dispersed storage (DS) processing module, wherein the write request message includes a slice name, a DS processing module most-recent slice revision, a new slice revision, and an encoded directory slice of directory information regarding storage of data;
    obtaining, from local memory, a DS unit most-recent slice revision based on the slice name; and
    when a revision number of the DS unit most-recent slice revision is same as a revision number of the DS processing module most-recent slice revision:
        storing the new slice revision as the DS unit most-recent slice revision; and
        storing the encoded directory slice.

2. The method of claim 1 further comprises:
    generating a write response message that includes an operation succeeded status code; and
    sending the write response message to the DS processing module.

3. The method of claim 1 further comprises:
    when the revision number of the DS unit most-recent slice revision is not the same as the revision number of the DS processing module most-recent slice revision:
        generating a write response message to include a condition status code indicating an unfavorable comparison of the revision numbers; and
        sending the write response message to the DS processing module.

4. The method of claim 1 further comprises:
    receiving the write request message, wherein the write request message further includes a DS processing module transaction identifier;
    determining whether the slice name has a locked state based on a local state indicator; and
    when the slice name has the locked state and a DS unit transaction identifier associated with the encoded directory slice is different than the DS processing module transaction identifier:
        generating a write response message that includes a transaction conflict status code; and
        sending the write response message to the DS processing module.

5. The method of claim 4 further comprises:
    when the slice name does not have a locked state:
        updating the local state indicator to indicate that the slice name has the locked state; and
        storing the DS processing module transaction identifier as the DS unit transaction identifier.

6. A dispersed storage (DS) unit comprises:
    an interface;
    a local memory; and
    a processing module operable to:
        receive, via the interface, a write request message from a dispersed storage (DS) processing module, wherein the write request message includes a slice name, a DS processing module most-recent slice revision, a new slice revision, and an encoded directory slice of directory information regarding storage of data;
        obtain, from the local memory, a DS unit most-recent slice revision based on the slice name; and
        when a revision number of the DS unit most-recent slice revision is same as a revision number of the DS processing module most-recent slice revision:
            store, in the local memory, the new slice revision as the DS unit most-recent slice revision; and
            store, in the local memory, the encoded directory slice.

7. The DS unit of claim 6, wherein the processing module further functions to:
    generate a write response message that includes an operation succeeded status code; and
    send, via the interface, the write response message to the DS processing module.

8. The DS unit of claim 6, wherein the processing module further functions to:
    when the revision number of the DS unit most-recent slice revision is not the same as the revision number of the DS processing module most-recent slice revision:
        generate a write response message to include a condition status code indicating an unfavorable comparison of the revision numbers; and
        send, via the interface, the write response message to the DS processing module.

9. The DS unit of claim 6, wherein the processing module further functions to:
    receive, via the interface, the write request message, wherein the write request message further includes a DS processing module transaction identifier;
    determine whether the slice name has a locked state based on a local state indicator; and
    when the slice name has the locked state and a DS unit transaction identifier associated with the encoded directory slice is different than the DS processing module transaction identifier:
        generate a write response message that includes a transaction conflict status code; and
        send, via the interface, the write response message to the DS processing module.

10. The DS unit of claim 9, wherein the processing module further functions to:
    when the slice name does not have a locked state:
        update, in the local memory, the local state indicator to indicate that the slice name has the locked state; and
        store, in the local memory, the DS processing module transaction identifier as the DS unit transaction identifier.

* * * * *